(12) United States Patent
Diffin et al.

(10) Patent No.: US 10,927,945 B2
(45) Date of Patent: Feb. 23, 2021

(54) POWER STEERING ASSEMBLY HAVING A COMPENSATION MECHANISM

(71) Applicant: STEERING SOLUTIONS IP HOLDING CORPORATION, Saginaw, MI (US)

(72) Inventors: Daniel J. Diffin, Freeland, MI (US); Jeffrey E. Beyerlein, Frankenmuth, MI (US); Jason T. Rutkiewicz, Freeland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 16/262,424

(22) Filed: Jan. 30, 2019

(65) Prior Publication Data

US 2019/0234511 A1 Aug. 1, 2019

Related U.S. Application Data

(60) Provisional application No. 62/624,323, filed on Jan. 31, 2018.

(51) Int. Cl.
| | | |
|---|---|---|
| *F16H 57/12* | (2006.01) | |
| *F16C 23/06* | (2006.01) | |
| *F16C 35/077* | (2006.01) | |
| *B62D 5/04* | (2006.01) | |
| *F16C 27/04* | (2006.01) | |
| *F16H 1/16* | (2006.01) | |
| *F16H 57/022* | (2012.01) | |
| *F16C 19/06* | (2006.01) | |
| *F16C 19/50* | (2006.01) | |
| *F16C 19/54* | (2006.01) | |
| *F16C 25/06* | (2006.01) | |

(52) U.S. Cl.
CPC ............ *F16H 57/12* (2013.01); *B62D 5/0403* (2013.01); *F16C 23/06* (2013.01); *F16C 27/04* (2013.01); *F16C 35/077* (2013.01); *F16H 1/16* (2013.01); *F16H 57/022* (2013.01); *F16C 19/06* (2013.01); *F16C 19/505* (2013.01); *F16C 19/546* (2013.01); *F16C 25/06* (2013.01); *F16C 2326/24* (2013.01); *F16C 2361/61* (2013.01); *F16H 2057/0224* (2013.01); *F16H 2057/127* (2013.01)

(58) Field of Classification Search
CPC .......... F16H 57/12; F16H 1/16; F16H 57/022; F16H 2057/0224; F16H 2057/127; F16H 2057/0213; F16H 55/24; F16C 23/06; F16C 35/077; F16C 27/04; F16C 19/06; F16C 19/505; F16C 19/546; F16C 25/06; F16C 2361/61; F16C 2326/24; B62D 5/0403; B62D 5/0409; B62D 3/04; B62D 5/00

See application file for complete search history.

(56) References Cited

U.S. PATENT DOCUMENTS

| | | | |
|---|---|---|---|
| 9,505,433 B2* | 11/2016 | Kimoto | ................ B62D 5/0454 |
| 2014/0174843 A1* | 6/2014 | Kimoto | ................ B62D 5/0424 180/444 |
| 2018/0187768 A1* | 7/2018 | Friederich | ................ F16H 1/16 |

* cited by examiner

*Primary Examiner* — Victor L MacArthur
(74) *Attorney, Agent, or Firm* — Dickinson Wright PLLC

(57) ABSTRACT

A bearing adjustment assembly includes a worm engaged with a worm gear. The assembly also includes a worm bearing located proximate an end of the worm. The assembly further includes a compensation mechanism engaging the worm bearing, the compensation mechanism being adjustable to bias the worm bearing to maintain or adjust a gear mesh load between the worm gear and the worm.

7 Claims, 5 Drawing Sheets

POWER STEERING ASSEMBLY HAVING A COMPENSATION MECHANISM

CROSS-REFERENCE TO RELATED APPLICATION

This patent application claims the benefit of priority to U.S. Provisional Patent Application Ser. No. 62/624,323, filed Jan. 31, 2018, which is incorporated herein by reference in its entirety.

BACKGROUND OF THE INVENTION

Vehicles may employ a power steering assist mechanism. The power steering assist mechanism provides torque assist to a steering shaft of the vehicle through a worm/worm gear reduction assembly. The worm/worm gear reduction assembly may wear over time and may impact the overall system feel and NVH performance. The wear over time reduces friction between the worm/worm gear reduction assembly and may cause poor NVH performance.

SUMMARY OF THE INVENTION

According to one aspect of the disclosure, a power steering assembly includes a housing. The assembly also includes a worm gear disposed within in the housing, the worm gear being rotatable about a first axis. The assembly further includes a worm at least partially disposed in the housing, the worm being arranged to engage the worm gear and rotate about a second axis. The assembly yet further includes a first worm bearing disposed proximate a first end of the worm. The assembly also includes a second worm bearing disposed proximate a second end of the worm. The assembly further includes a compensation mechanism disposed within the housing and engaging the first worm bearing, the compensation mechanism being adjustable to bias the first worm bearing to maintain or adjust a gear mesh load between the worm gear and the worm.

According to another aspect of the disclosure, a bearing adjustment assembly includes a worm engaged with a worm gear. The assembly also includes a worm bearing located proximate an end of the worm. The assembly further includes a compensation mechanism engaging the worm bearing, the compensation mechanism being adjustable to bias the worm bearing to maintain or adjust a gear mesh load between the worm gear and the worm.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, it is to be understood that the disclosed embodiments are merely illustrative of the present disclosure that may be embodied in various and alternative forms. Various elements of the disclosed embodiments may be combined or omitted to form further embodiments of the present disclosure. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
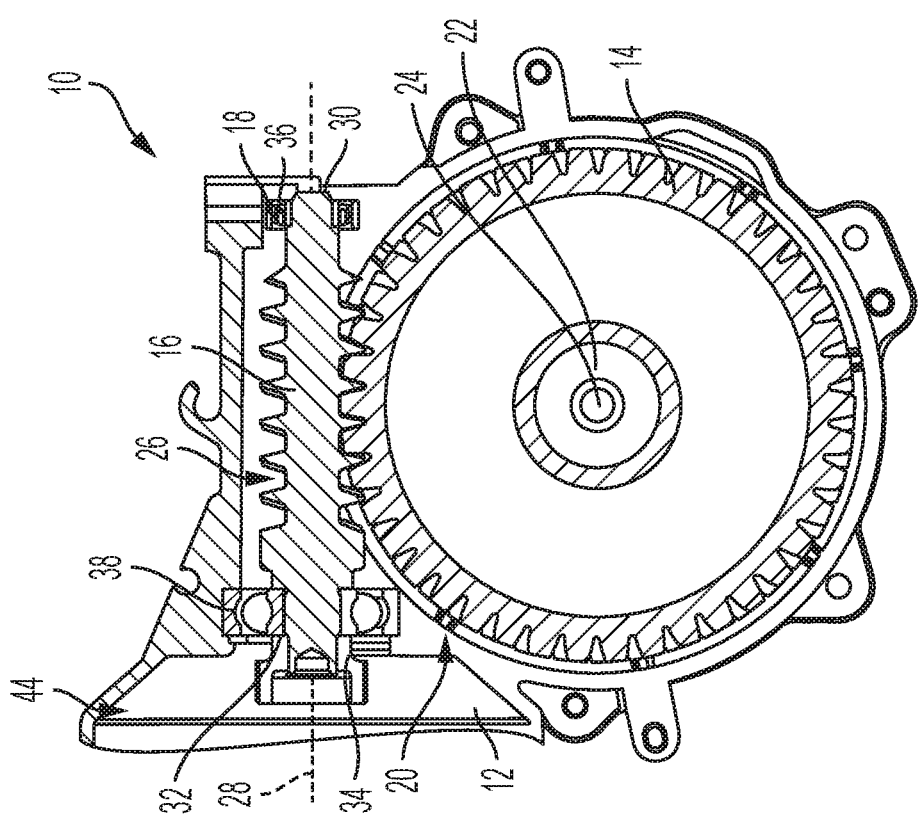
FIG. 1 is a partial cross-sectional view of a power steering assembly.

Referring to FIG. 1, a partial cross-sectional view of a power steering assembly 10 is shown. The power steering assembly 10 may be an electric power steering gear box or the like. The power steering assembly 10 includes a housing 12, a worm gear 14, a worm 16, and a compensation mechanism 18.

The housing 12 defines a first interior cavity portion 20 that receives and houses the worm gear 14 and a portion of a first control shaft 22. At least a portion of the first control shaft 22 extends through the worm gear 14 and the housing 12 along a first axis 24. The housing 12 also defines a second interior cavity portion 26 that extends along a second axis 28 between a first end 30 and a second end 32. The first end 30 and the second end 32 may be open ends. In some embodiments, the first end 30 may be closed. The second axis 28 may be disposed transverse to the first axis 24.

Figure 3:
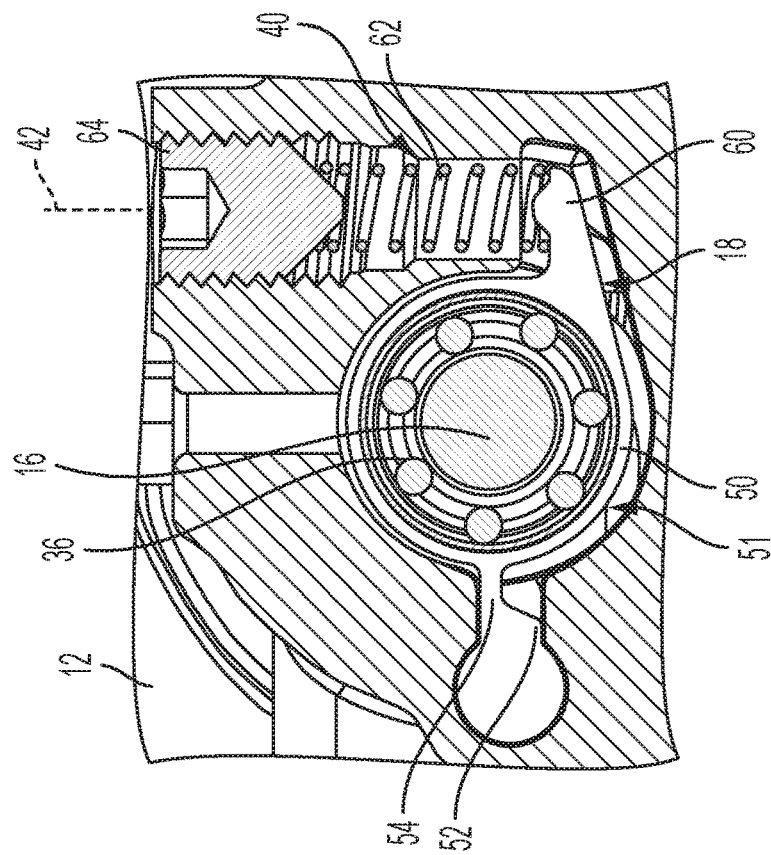
FIG. 3 is a sectional view of FIG. 2 further illustrating the compensation mechanism.

The second interior cavity portion 26 receives and houses at least a portion of the worm 16. Threads of the worm 16 are arranged to engage the worm gear 14 such that rotation of the worm 16 about the second axis 28 causes rotation of the worm gear 14 and therefore rotation of the first control shaft 22 about the first axis 24. The worm 16 may be defined by at least a portion of a second control shaft 34 that extends along the second axis and extends at least partially beyond the second end 32. The second control shaft 34 may be rotatably supported by a first worm bearing 36 (also referred to herein as an outboard worm bearing 36) that is disposed proximate the first end 30 of the second interior cavity portion 26 and a second worm bearing 38 (also referred to herein as an inboard worm bearing 38) that is disposed proximate the second end 32 of the second interior cavity portion 26. The first end 32 of the second interior cavity portion 26 also defines a spring bore 40 (FIG. 3). The spring bore 40 extends along a spring bore axis 42 (FIG. 3) that is disposed generally perpendicular to the second axis 28.

A third interior cavity portion 44 of the housing 12 extends from the second end 32 of the second interior cavity portion 26. The third interior cavity portion 44 may be a motor cone housing. At least a portion of the second control shaft 34 extends into and at least partially through the third interior cavity portion 44.

Figure 2:
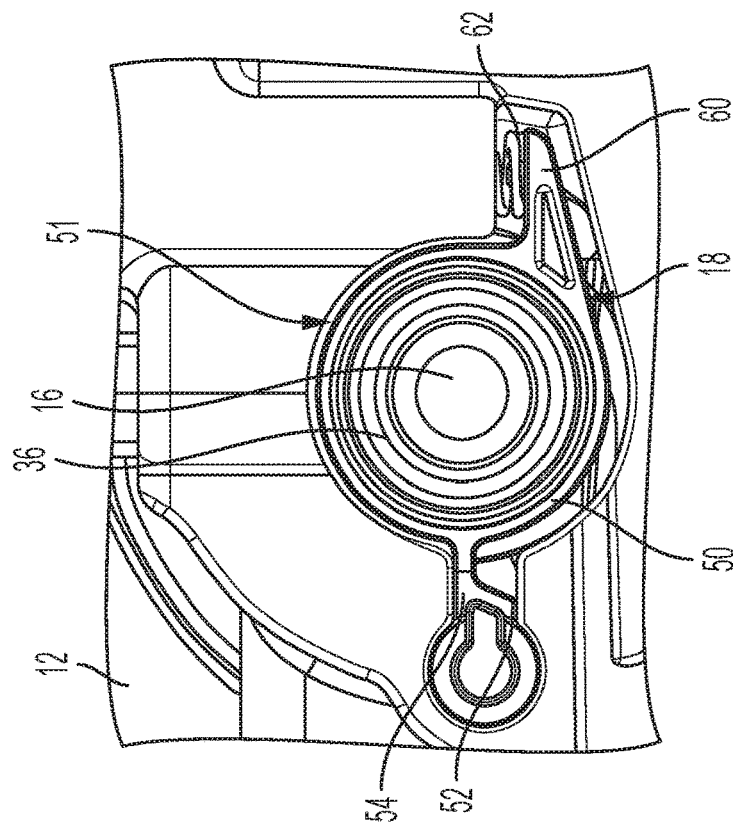
FIG. 2 is a side view of FIG. 1 illustrating a compensation mechanism installed within a housing of the power steering assembly.

Referring now to FIGS. 2 and 3, the compensation mechanism 18 is illustrated in greater detail. The compensation mechanism 18 is disposed proximate the first end 30 of the second interior cavity portion 26. The compensation mechanism 18 is disposed proximate the outboard worm bearing 36. The compensation mechanism 18 interfaces with the housing 12 to hold the compensation mechanism 18 in place. The compensation mechanism 18 is arranged to reduce an as built friction variation and friction change over the life of the worm 16 and worm gear 14 interface within the housing 12 of the power steering assembly 10 by maintaining or adjusting a gear mesh load between the worm gear 14 and the worm 16. The compensation mechanism 18 may also be arranged to set friction between the worm 16 and the worm gear 14 interface to a precise initial target or a net built target, therefore reducing overall manufacturing variation.

The compensation mechanism 18 is a single, integrally formed component having a main body portion 50 that is substantially circular in cross section and surrounds the outboard worm bearing 36. The main body portion 50 is disposed within the second interior cavity portion 26 of the housing 12, with a controlled clearance 51 present between the outer diameter of the main body portion 50 and the housing 12. The controlled clearance 51 is a strain limiter machined into the housing 12. Extending from the main body portion 50 is an arm 52 is press fit into the housing 12. The arm 52 includes a hinge portion 54 that flexes and allows the outboard worm bearing 36 to float about—or relative to—the inboard worm bearing 38.

The compensation mechanism 18 includes a spring locator and support 60 extending from the main body portion 50. The spring locator and support 60 extends far enough to be positioned proximate an end of the spring bore 40 of the housing 12. The spring bore 40 is aligned with the spring locator and support 60. A biasing member 62, such as a spring, is at least partially received by the spring bore 40 of the housing 12 and. The biasing member 62 is held or retained by the spring locator and support 60. A spring retainer 64 is used to compress the biasing member 62, loading the worm 16 into the worm gear 14. The spring 62 and the hinge portion 54 have a low spring rate to minimize load variation into the gear mesh, compensating for worm to worm gear variations and wear over time. The consistent loading may lead to lower friction variation between the worm and the worm gear to improve NVH, ride and handling performance of the power steering assembly.

Figure 4:
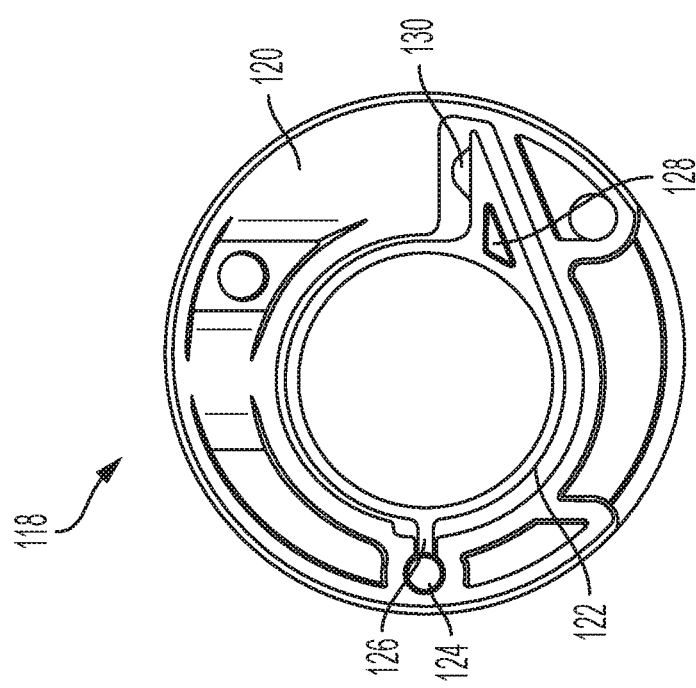
FIG. 4 is an elevational view of the compensation mechanism according to another aspect of the disclosure.

Referring to FIG. 4, another embodiment of the compensation mechanism is illustrated and referred to with numeral 118. In the illustrated embodiment, the compensation mechanism 118 includes an outer portion 120 that is an injection molded component and an inner portion 122 that is a separate injection molded component. The outer and inner portions 120, 122 are pressed together at a pin locking feature 124. The outer and inner portions 120, 122 are assembled into the housing 12 and onto the outboard worm bearing 36. With the components being separate, the compensation mechanism 118 facilitates control of the clearance between the two components without the constraint of the injection molding steel thickness required to fit in that area to mold it as one piece.

The outer portion 120 interfaces with the housing 12. The inner portion 122 is disposed within and is hingedly connected to the outer portion 120 with the pin locking feature 124, as described above, thereby forming a hinge 126. The inner portion 122 is at least partially disposed about the outboard worm bearing 36. The inner portion 122 includes an arm 128 that defines a spring locator and support 130. The inner portion 122 is arranged to pivot or move relative to the outer portion 120 due to the hinge 126 to adjust or maintain a gear mesh load between the worm 16 and the worm gear 14 to compensate for worm 16 to worm gear 14 variations and wear.

A bearing holder is at least partially defined by an inner surface of the outer portion 120. The bearing holder holds, or at least partially receives, the outboard worm bearing 36. The hinge 126 and the bearing holder allow the outboard worm bearing 36 to float about—or relative to—the inboard worm bearing 38.

A backstop surface may be defined by at least one of the outer portion 120 or the inner portion 122. The backstop surface of the compensation mechanism 118 may control the amount and direction the worm 16 may move or travel relative to the worm gear 14 during loading. This limited travel impacts or affects NVH performance and gear performance. This limited travel also limits the strain on the bearing holder and the hinge 126 to ensure durability or robustness.

As described above in connection with the embodiment illustrated in FIGS. 1-3, the housing 12 defines a spring bore 40. A biasing member, such as a spring, is at least partially received by the spring bore 40 of the housing 12 and is held or retained by the spring locator and support 130. A spring retainer is used to compress the biasing member, loading the worm 16 into the worm gear 14. The spring and the hinge 126 have a low spring rate to minimize load variation into the gear mesh, compensating for worm to worm gear variations and wear over time. The consistent loading may lead to lower friction variation between the worm and the worm gear to improve NVH, ride and handling performance of the power steering assembly.

Figure 5:
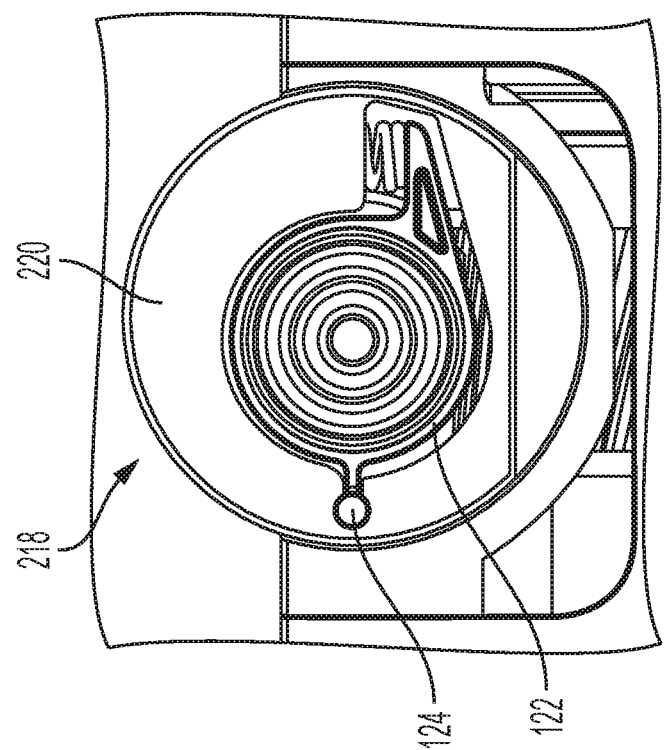
FIG. 5 is an elevational view of the compensation mechanism according to another aspect of the disclosure.

Referring now to FIG. 5, the compensation mechanism is illustrated according to another embodiment and referenced with numeral 218. Compensation mechanism 218 includes a machined metal outer portion 220. In some embodiments, the machined metal outer portion 220 is a machined aluminum piece. As with the embodiment of FIG. 4, the inner portion 122 is secured to the outer portion 220 with pin locking feature 124.

Figure 7:
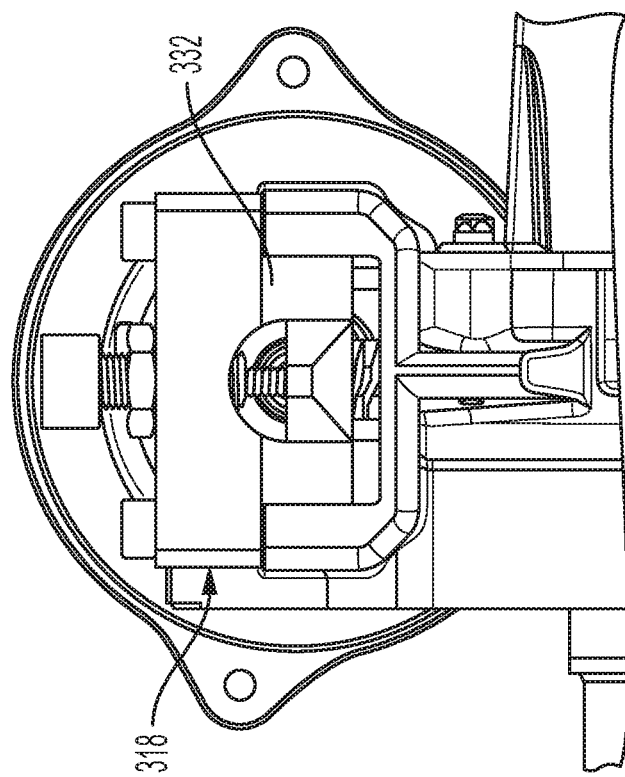
FIG. 7 is an end view of the compensation mechanism of FIG. 6.
Figure 6:
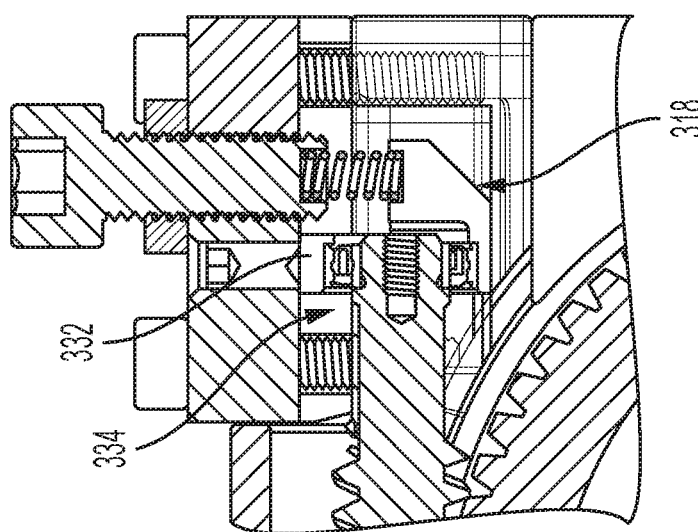
FIG. 6 is a sectional view of the compensation mechanism according to another aspect of the disclosure.

FIGS. 6 and 7 illustrate another embodiment of the compensation mechanism 318. In the illustrated embodiment, the compensation mechanism 318 includes a bearing holder 332 that does not pivot about a flexing hinge. Rather, the bearing holder 332 slides radially within a slot 334 to achieve the above-described movement of the outboard worm bearing 36. The embodiment illustrated in FIGS. 6 and 7 is a modular design and can be substituted for different delash mechanism on the same housing. Housing may be bolted to housing 12 and the compensation mechanism 318 slides radially in a slot machined into housing 12 and may not require the small housing 334.

Figure 8:
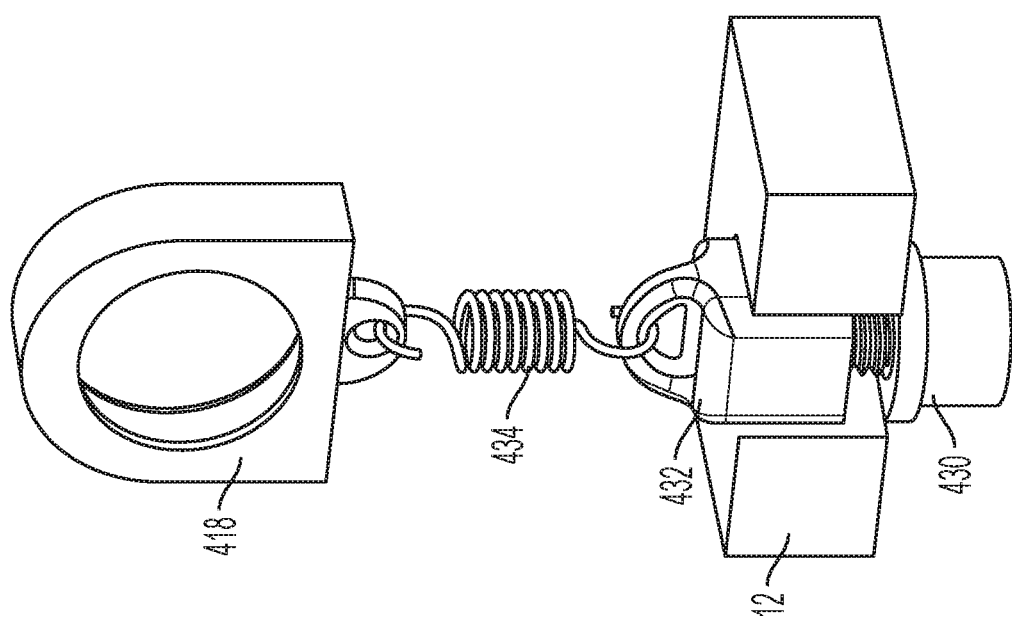
FIG. 8 is a perspective view of the compensation mechanism according to another aspect of the disclosure.

FIG. 8 illustrates another embodiment of the compensation mechanism 418. In the illustrated embodiment, a tension coil spring 434 is utilized to change the packaging space that the compensation mechanism 418 requires within the housing 12. As shown, an adjuster bolt 430 is in threaded engagement with a spring adjuster 432. The spring adjuster 432 is positioned to slide within an aperture of the housing 12. A spring 434 is in tension due to engagement at one end with the spring adjuster 432 and at the opposite end with the compensation mechanism 418 that is in contact with the outboard worm bearing 36.

It is to be appreciated that although the above-described embodiments refer to a compression or tension coil spring, other suitable biasing devices are contemplated. Such alternative biasing devices may be oriented in alternative manners from that illustrated.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A power steering assembly comprising:
    a housing;
    a worm gear disposed within in the housing, the worm gear being rotatable about a first axis;
    a worm at least partially disposed in the housing, the worm being arranged to engage the worm gear and rotate about a second axis;
    a first worm bearing disposed proximate a first end of the worm;
    a second worm bearing disposed proximate a second end of the worm; and
    a compensation mechanism disposed within the housing and engaging the first worm bearing, the compensation mechanism being adjustable to bias the first worm bearing to maintain or adjust a gear mesh load between the worm gear and the worm wherein the compensation mechanism is a single, integrally formed component, and wherein the compensation mechanism comprises:
        a main body portion,
        an arm extending from the main body portion, and
        a spring support and locator extending from the main body portion, the main body portion surrounding at least a portion of the first worm bearing, the arm press fit within the housing in a hinged manner with a hinge region of the arm, and the spring support and locator in direct contact with a spring disposed at least partially within the housing.

2. The power steering assembly of claim 1, wherein the housing defines a spring bore, the spring located within the spring bore compression of the spring adjusting the compensation mechanism biasing of the first worm bearing.

3. The power steering assembly of claim 2, wherein the spring bore is perpendicular to the second axis.

4. A bearing adjustment assembly comprising:
    a worm engaged with a worm gear;
    a worm bearing located proximate an end of the worm; and
    a compensation mechanism engaging the worm bearing, the compensation mechanism being adjustable to bias the worm bearing to maintain or adjust a gear mesh load between the worm gear and the worm, wherein the compensation mechanism is a single, integrally formed component, and wherein the compensation mechanism comprises:
        a main body portion,
        an arm extending from the main body portion, and
        a spring support and locator extending from the main body portion, the main body portion surrounding at least a portion of the worm bearing, the arm press fit within a housing in a hinged manner with a hinge region, and the spring support and locator in direct contact with a spring at least partially disposed within the housing.

5. The bearing adjustment assembly of claim 4, wherein the compensation mechanism is adjusted with the spring.

6. The bearing adjustment assembly of claim 5, wherein the worm, the worm gear and the compensation mechanism are at least partially located within a housing, the housing defining a spring bore that the spring is positioned within.

7. The bearing adjustment assembly of claim 6, wherein the spring bore is oriented perpendicular to a longitudinal axis of the worm.

* * * * *